United States Patent
Bolt et al.

(10) Patent No.: US 6,892,275 B2
(45) Date of Patent: May 10, 2005

(54) STORAGE SYSTEM UTILIZING AN ACTIVE SUBSET OF DRIVES DURING DATA STORAGE AND RETRIEVAL OPERATIONS

(75) Inventors: Thomas B. Bolt, Encinitas, CA (US); Kevin C. Daly, Newport Beach, CA (US)

(73) Assignee: Quantum Corporation, San Jose, CA (US)

( * ) Notice: Subject to any disclaimer, the term of this patent is extended or adjusted under 35 U.S.C. 154(b) by 314 days.

(21) Appl. No.: 10/072,527

(22) Filed: Feb. 5, 2002

(65) Prior Publication Data

US 2003/0149840 A1 Aug. 7, 2003

(51) Int. Cl.$^7$ .............................................. G06F 12/00
(52) U.S. Cl. ..................................................... 711/114
(58) Field of Search ........................ 711/114, 111, 112

(56) References Cited

U.S. PATENT DOCUMENTS

| | | | | |
|---|---|---|---|---|
| 5,560,022 A | * | 9/1996 | Dunstan et al. | 713/300 |
| 5,666,538 A | * | 9/1997 | DeNicola | 713/320 |
| 6,097,679 A | * | 8/2000 | Ohtaki | 369/47.11 |
| 6,463,495 B1 | * | 10/2002 | Angelo et al. | 710/305 |
| 2001/0043530 A1 | * | 11/2001 | Nakatsuka et al. | 369/53.1 |
| 2002/0114092 A1 | * | 8/2002 | Yang | 360/31 |
| 2003/0048571 A1 | * | 3/2003 | Soyama et al. | 360/78.06 |
| 2003/0103289 A1 | * | 6/2003 | Sakamoto | 360/70 |
| 2003/0200473 A1 | * | 10/2003 | Fung | 713/320 |

FOREIGN PATENT DOCUMENTS

JP       2002279602 A  *  9/2002  ............ G11B/5/09

OTHER PUBLICATIONS

Pages from ATTO Technology, Inc. Website www.attotech.com downloaded on Aug. 29, 2002, author unknown.
Pages from Medea Corporation Website www.medea.com downloaded on Aug. 29, 2002 author unknown.
Pages from N Stor Technologies Website www.nstor.com downloaded on Aug. 29, 2002 author unknown.
Pages from Raidtec Corporation Website www.raidtec.com downloaded on Aug. 29, 2002 author unknown.
Pages from Chaparral Network Storage Website www.chaparralnet.com downloaded on Aug. 29, 2002 author unknown.

* cited by examiner

*Primary Examiner*—Kevin Verbrugge
(74) *Attorney, Agent, or Firm*—James P. Broder; Steven G. Roeder (57) ABSTRACT

A storage system (14) that stores data from a host system (12) includes a plurality of disk drives (30), and a controller (32) that controls the disk drives (30). At least one of the disk drives (30) is in a stand-by mode and one of the disk drives (30) is in a write/read mode at approximately the same time. In one embodiment, the controller (32) directs data to a first subset (500) of disk drives (30) and a second subset (502) of disk drives (30) simultaneously. In this embodiment, at least one of the subsets (500)(502) can include five disk drives (30). Further, during a data transfer, one third of the disk drives (30) can be in the write/read mode while two-thirds of the disk drives (30) are in the stand-by mode.

37 Claims, 6 Drawing Sheets

STORAGE SYSTEM UTILIZING AN ACTIVE SUBSET OF DRIVES DURING DATA STORAGE AND RETRIEVAL OPERATIONS

FIELD OF THE INVENTION

The present invention relates generally to storage systems for storing data. More specifically, the present invention relates a system and method for controlling disk drives to enable high-density packaging of disk drives.

BACKGROUND

Disk drives are widely used in computers and data processing systems for storing information in digital form. In conventional disk drives, a transducer "flies" upon an air bearing in very close proximity to a storage surface of a rotating data storage disk. The storage surface carries a thin film of magnetic material having a multiplicity of magnetic storage domains that may be recorded and read back by the transducer.

As computer use continues to increase, there is naturally a corresponding increase in the need to find sufficient data storage space for the data on the computer. Presently, storage systems are used to backup data from computer systems. One type of storage system utilizes one or more tape drives and one or more tape cartridges. Tape storage systems are relatively inexpensive to operate and can store relatively large amounts of data. However, tape backup systems provide relatively slow access to the data.

Another type of storage system utilizes a plurality of disk drives that are positioned within a housing. Disk storage systems provide relatively quick access to data. Unfortunately, the disk drives can generate significant amounts of heat energy during normal operation. This heat energy must be removed from the housing to inhibit the disk drives from reaching or exceeding the maximum operating temperature, which may cause one or more of the disk drives to fail prematurely.

A typical cooling system relies upon moving large volumes of air across the disk drives to remove the heat energy. This type of cooling system requires relatively large open spaces around the disk drives. The necessity of these open spaces limits the overall density of the disk drives relative to the volumetric space of the storage system.

When used for primary storage, there is also a strong motivation to have each individual disk drive be easily accessible for the purposes of replacing failed drives without having to power down the entire unit or affect the operation of other non-failed drives. This also places limitations on how densely disk drives may be packaged in a disk array. If the disk array is used for infrequently accessed data, such as would be the case for a secondary storage array, an array used for backup purposes, or an array emulating a tape drive system, the requirements for physical accessibility of individual drives can be greatly relaxed allow much greater packing densities. Furthermore, short periods of inaccessibility or delays in access are generally tolerable in these types of applications.

In light of the above, there is a need for a storage system having a relatively large data storage capacity and a relatively small system footprint. Additionally, there is a need for a storage system that reduces the amount of heat generated by the storage system. Further, there is a need for a storage system having enhanced reliability and durability.

SUMMARY

The present invention is directed to a storage system that stores data from a host system. The storage system includes a plurality of disk drives, and a controller that controls the disk drives. As provided herein, at least one of the disk drives is in a stand-by mode and one of the disk drives is in a write/read mode during the transfer of data to the storage system. By maintaining some of the disk drives in the standby mode, the power requirements for the overall storage system is significantly reduced. Reducing the power requirements has the benefit of reducing the total heat generated by the system. This allows the disk drives to be packed closer together than would be possible if all of the disk drives were spinning continuously. This also significantly reduces the overall cost of the storage system by reducing the capacity of the power supplies needed and the maximum internal data bandwidth required. Additionally, by spinning up only those disk drives required for the data transfer, this improves the ruggedness and durability of storage system.

In one embodiment, the controller directs data to a first drive subset of disk drives and a second drive subset of disk drives simultaneously. In this embodiment, at least one of the subsets can include five disk drives.

During a data transfer, the percentage of the disk drives of the storage system in the write/read mode can vary according to the design requirements of the storage system. For example, in one embodiment, during a data transfer, one third of the disk drives are in the write/read mode while two-thirds of the disk drives are in the stand-by mode. Alternately, in another embodiment, during a data transfer, one half of the disk drives are in the write/read mode while one half of the disk drives are in the stand-by mode. Still alternately, in another embodiment, during a data transfer, as few as one or two disk drives may be in the write/read mode while the remainder of the disk drives are in the stand-by mode.

The present invention is also directed to a method to transfer data, and a combination that includes the storage system and the host system.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DESCRIPTION

Figure 1A:
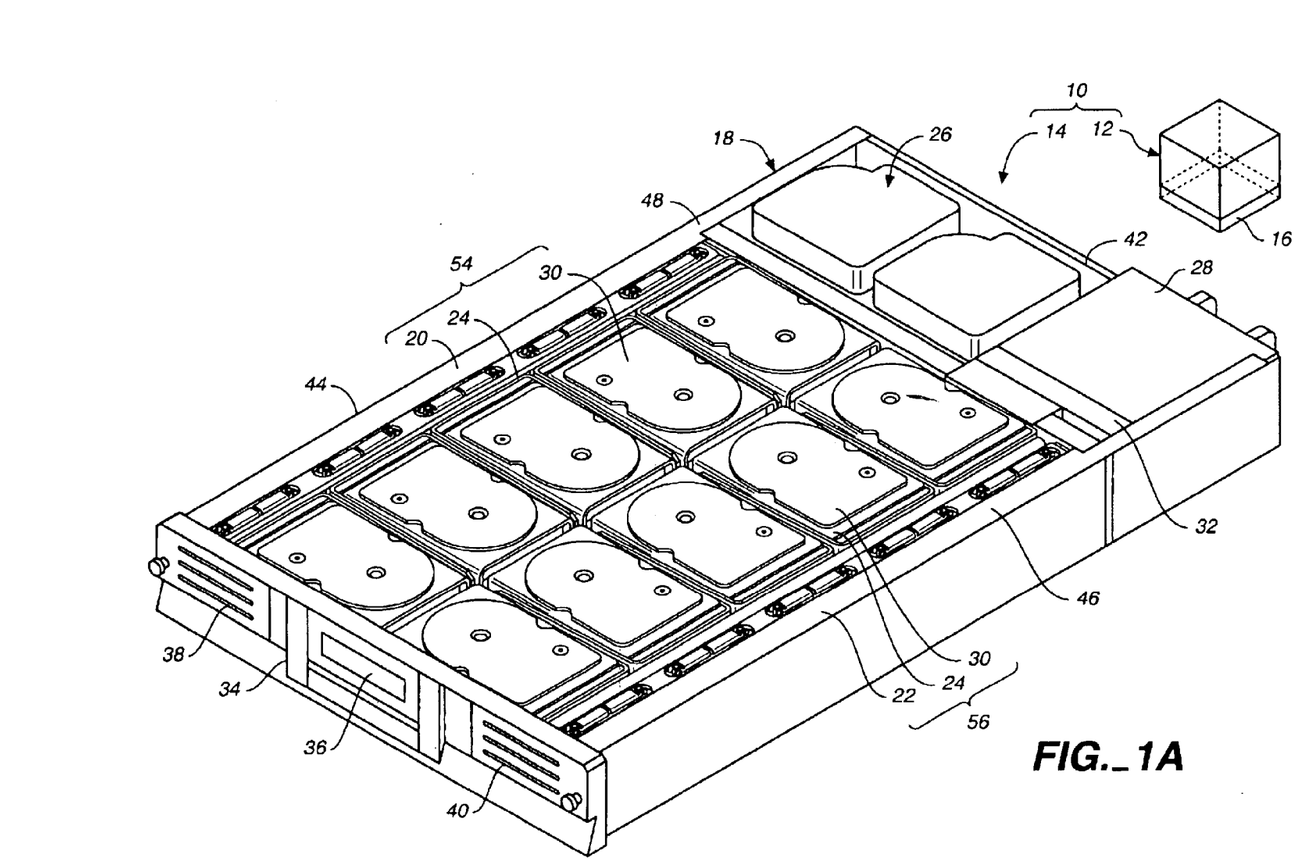
FIG. 1A is a perspective view of a data storage system and a host system having features of the present invention.

FIG. 1A illustrates a combination 10 that includes a host system 12 (illustrated as a box) and data storage system 14. The host system 12 accesses the data storage system 14 to read and write data. The data storage system 14 can be used with a number of alternate host systems 12. For example, the host system 12 can be a single computer or a plurality of computers that are linked with a network or common Input/Output bus or channel. Alternately, for example, the host system 12 can be an application specific machine that needs access to digital data such as a broadcast video player.

The host system 12 can be electrically connected to the storage system 14 via a fibre-channel interface. Alternately, for example, the host interface could be parallel SCSI, gigabit Ethernet, Firewire, or any of a number of different host interfaces.

In FIG. 1A, the host system 12 includes a host storage device 16 that stores the data from the host system 12 in real time. In this embodiment, the data storage system 14 provides a backup copy, e.g. a mirror image of the data stored on the host storage system 16. With this design, the storage system 14 can be used to restore the data to the host system 12 in the event the host storage device 16 is damaged and/or destroyed.

How frequently, the data from the host storage device 16 is copied to the storage system 14 can vary. For example, the data can be copied to the storage system 14 once a week, once every day, every hour, every minute or in increments of a minute.

As provided herein, the data storage system 14 allows for the relatively rapid backing up of data. Further, the data storage system 14 provides a relatively large data storage capacity within a relatively small system footprint. Additionally, the data storage system 14 has enhanced reliability and durability.

The storage system 14 provided herein can be used for other data protection environments other than backup and restore. For example, the storage system 14 can be designed to be the primary storage for the host system 12. More specifically, for example, this device could be used as the primary storage for specific applications such as video stream serving.

The design of the storage system 14 and the components in the storage system 14 can be varied. In the embodiment illustrated in FIG. 1A, the storage system 14 includes a housing 18, a first drive rail 20, a second drive rail 22, a plurality of brackets 24, a fluid source 26, one or more power supplies 28, a plurality of disk drives 30 and a controller 32. An alternate embodiment may employ a plurality of controllers 32. With this design, the storage system 14 will still be able to operate in the event that one of the controllers 32 fails. The storage system 14 illustrated in FIG. 1A is sized and shaped to be mounted in a standard 19 inch rack enclosure. Alternately, the storage system 14 could be designed for other sized rack enclosures or for a standalone table-top configuration.

The housing 18 supports the components of the storage system 14. In FIG. 1A, the housing 18 is generally rectangular frame shaped and encircles the components of the storage system 14. The housing 18 can be made of metal or another suitable rigid structure. The housing 18 can include (i) a front housing side 34 having an LCD operator control panel 36, a left vent 38, and a spaced apart right vent 40, (ii) a rear housing side 42. (iii) a left housing side 44, (iv) a right housing side 46, and (v) a passive mid-wall 48 that extends transversely between the housing sides 44, 46. The mid-wall 48 separates the fluid source 26, the power supplies 28, and controller 32 from the disk drives 30.

Figure 1B:
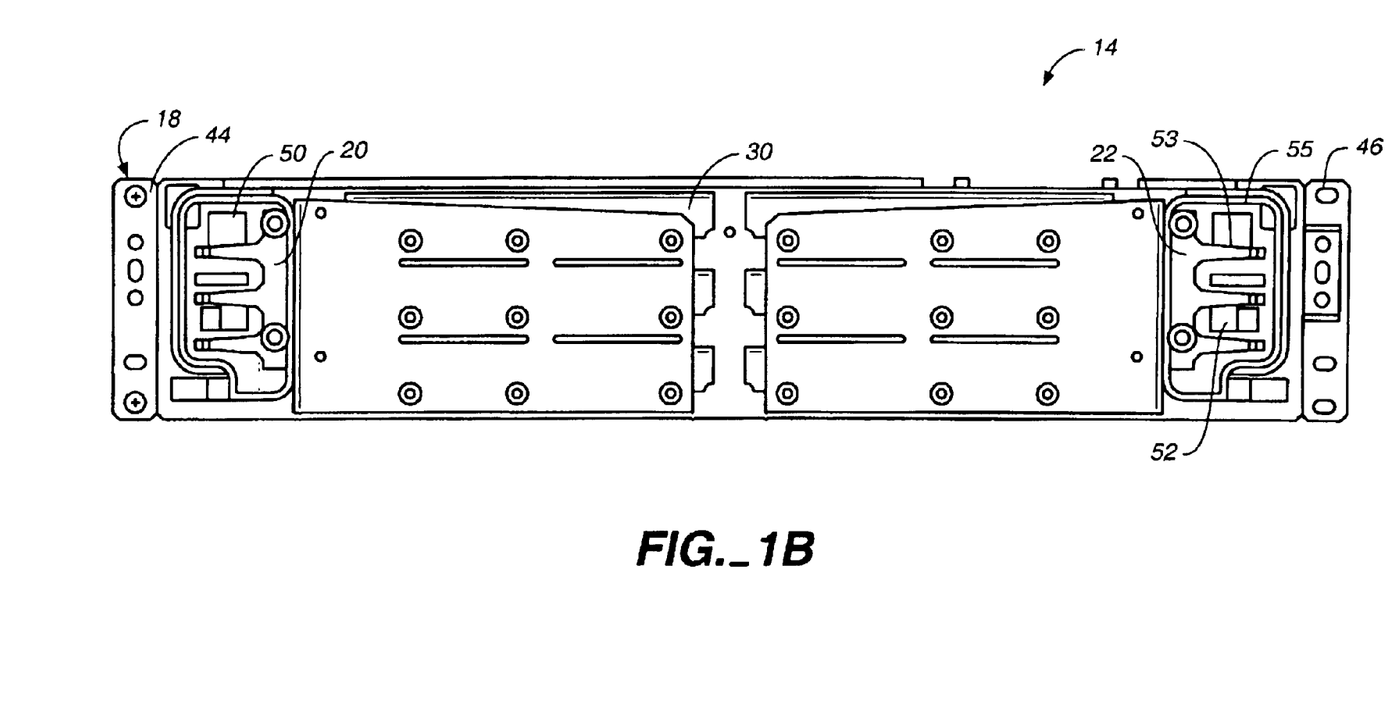
FIG. 1B is a front plan view of a portion of the storage system.

The drive rails 20, 22 secure the brackets 24 to the housing 18. FIG. 1B illustrates a front view of the storage system 14 with the front housing side removed. FIG. 1B illustrates that the first drive rail 20 cooperates with the left housing side 44 to define a left rail channel 50 and the second drive rail 22 cooperates with the right housing side 46 to define a right rail channel 52. The channels 50, 52 are used for cooling the disk drives 30. More specifically, referring to FIGS. 1A and 1B, heat from the disk drives 30 is transferred to the brackets 24 and subsequently to the drive rails 20, 22 via conduction. Subsequently, fluid from the fluid source 26 is directed through the rail channels 50, 52 to cool the drive rails 20, 22 via convection. In this embodiment, because conduction is used to transfer heat from the disk drives 30, the space between the disk drives 30 can be minimized. As a result thereof, more disk drives 30 can be positioned in a given area and the storage system 14 can store a relatively large amount of data.

In FIG. 1A, each drive rail 20, 22 is designed to receive five brackets 24. However, each drive rail 20, 22 could be designed to receive more than five or less than five brackets 24 depending upon the particular requirements of the storage system 14. In FIG. 1A, the brackets 24 are mounted on the drive rails 20, 22 with a minimal amount of horizontal spacing between the individual brackets 24. This helps to enable more data to be stored in a smaller physical space. It should be noted that the storage system 14 could be designed with less than two or more than two drive rails 20, 22.

As can be seen in FIG. 1B, each drive rail 20, 22 can include one or more fins 53 that cantilever into the respective channel 50, 52. The fins 53 enhance heat transfer from the drive rails 20, 22 because the surface area of the drive rails 20, 22 that is exposed to the fluid flowing through the channels 50, 52 is increased.

Additionally, each drive rail 20, 22 can include a handle 55 that facilitates the removal of the drive rails 20, 22 and the disk drives 30 attached to the drive rails 20, 22 out of the housing 18. In FIG. 1B, each handle is substantially C-shaped. The handle 55 is designed to rotate between a closed position and an open position. When not in use, the handle 55 is biased to return to the closed position.

The brackets 24 secure the disk drives 30 to the drive rails 20, 22. In FIG. 1A, five brackets 24 are used to secure fifteen disk drives 30 to the first drive rail 20 and five brackets 24 are used to secure fifteen disk drives 30 to the second drive rail 22. Alternately, the storage system 14 could be designed with more than ten or less than ten brackets 24.

Additionally, the storage system 14 can include one or more fasteners (not shown in FIG. 1A) that allow for the relatively quick and easy removal of the brackets 24 from the drive rails 20, 22. This facilitates removal and/or replacement of one or more of the disk drives 30.

The brackets 24 and the drive rails 20, 22 are made of a rigid material. The brackets 24 and drive rails 20, 22 can be made of a material having a relatively high coefficient of thermal conductivity to enhance the conduction cooling of the disk drives 30. For example, the brackets 24 and the drive rails 20, 22 can be made from a copper alloy such as copper alloy 110 or an aluminum alloy. Alternatively, other materials with similarly high thermal conductivities may be utilized. With this design, the brackets 24 and the drive rails 20, 22 enable much of the heat generated from the operation of the disk drives 30 to be transferred away from the disk drives 30 and toward the drive rails 20, 22.

A thermal gasket (not shown) can be used (i) at the mounting interface of the disk drives 30 and the respective brackets 24, and (ii) at the mounting interface of the brackets 24 and the drive rails 20, 22 to enhance conduction.

The fluid source 26 provides fluid that is moved through the storage system 14 to remove heat away from the storage system 14. In FIG. 1A, the fluid source 26 includes dual redundant fans that pull fluid, e.g. air, primarily through the rail channels 50, 52 to cool the disk drives 30. With this design, the storage system 14 will still be able to operate in the event that one of the fluid sources 26 fails. Alternately, for example, the fluid could be blown through the rail channels 50, 52. Still alternately, a single fan could be used to cool the storage system 14.

It should be noted, in the embodiment illustrated in FIG. 1A, the fluid source 26 also pulls a relatively small amount of fluid from around the disk drives 30 to provide a small amount of convection cooling of the disk drives 30. In yet another embodiment, the storage system 14 could be designed to primarily utilize convection cooling of the disk drives 30.

The one or more power supplies 28 direct current to the disk drives 30 to operate and control the disk drives 30. Two power supplies 28 can be utilized to provide redundancy. With this design, the storage system 14 will still be able to operate in the event that one of the power supplies 28 fails. Alternately, a single power supply 28 could be utilized.

The number of disk drives 30 utilized in the storage system 14 can be varied to suit the storage requirements of the storage system 14. For example, in FIG. 1A, the storage system 14 includes thirty disk drives 30 (the top ten disk drives 30 can be seen in FIG. 1A, and the six front disk drives 30 can be seen in FIG. 1B). Alternately, for example, the storage system 14 could be designed with more than thirty or less than thirty disk drives 30. For example, the storage system 14 could be designed with only fifteen disk drives 30.

It should be noted that the combination of the first drive rail 20, the five brackets 24 secured to the first drive rail 20 and the fifteen disk drives 30 secured with the five brackets 24 to the first drive rail 20 are collectively referred to as the first rail assembly 54. Somewhat similarly, the combination of the second drive rail 22, the five brackets 24 secured to the second drive rail 22 and the fifteen disk drives 30 secured with the five brackets 24 to the second drive rail 22 are collectively referred to as the second rail assembly 56. The storage system 14 can be designed with less than two or more than two rail assemblies 54, 56.

Figure 2:
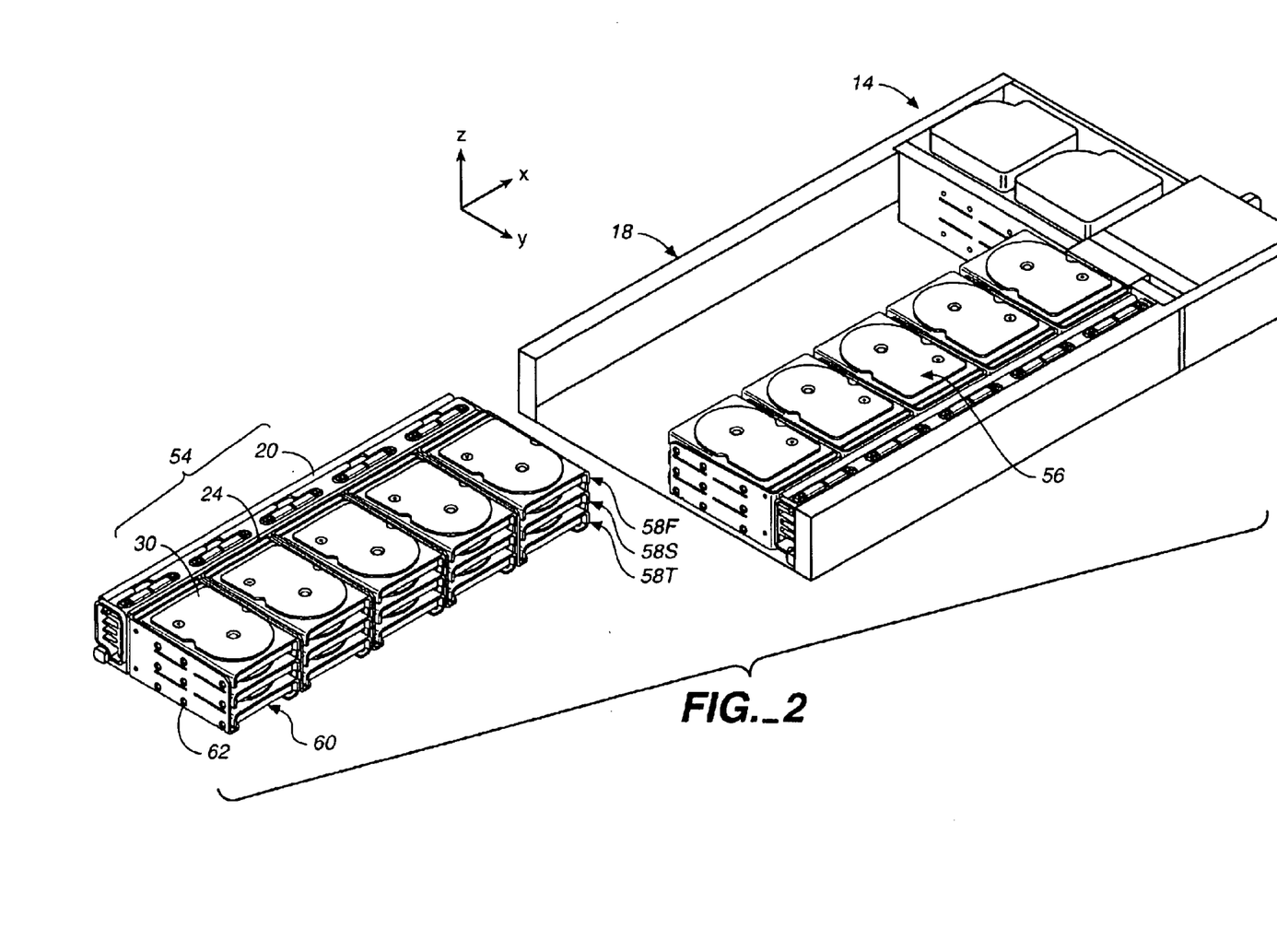
FIG. 2 is a partially exploded perspective view of the data storage system of FIG. 1A.

FIG. 2 illustrates a partly exploded perspective view of the storage system 14. More specifically, FIG. 2 illustrates the storage system 14 with the first rail assembly 54 removed from the housing 18 and the second rail assembly 56 remaining in the housing 18. In the embodiment illustrated in FIG. 2, each rail assembly 54, 56 can be easily removed to test, repair and/or replace the disk drives 30.

It should also be noted that FIG. 2 includes a coordinate system that designates an X axis, a Y axis that is orthogonal to the X axis, and a Z axis that is orthogonal to the X and Y axes. It should be noted that these designations are arbitrary and the storage system 14 can be rotated relative to the coordinate system. Further, the X, Y and Z axes can also be referred to herein as the first, second and third axes respectively.

FIG. 2 illustrates that the first rail assembly 54 includes fifteen disk drives 30 that are secured with five brackets 24 to the first drive rail 20. As viewed in FIG. 2, for the first rail assembly 54, the disk drives 30 are arranged in three, spaced apart rows that extend along the X axis, namely an upper, first row 58F, an intermediate, second row 58S, and a bottom, third row 58T. In this embodiment, each row 58F, 58S, 58T includes five disk drives 30. Stated another way, the disk drives 30 are arranged in five, spaced apart columns 60 that extend along the Z axis. Each column 60 includes three disk drives 30. However, it should be noted that the first rail assembly 54 could be designed so that each row 58F, 58S, 58T contained more than five or less than five disk drives 30 and/or each column 60 contained more than three or less than three disk drives 30.

As used herein, the term drive pack 62 refers to the combination of one bracket 24 and the disk drives 30 secured to that bracket 24. In the embodiment illustrated in FIG. 2, each drive pack 62 includes three disk drives 30 and the first rail assembly 54 includes five drive packs 62.

In FIG. 2, the second rail assembly 56 is a mirror image of the first rail assembly 54. Alternately, the rail assemblies 54, 56 can have different designs.

Figure 3:
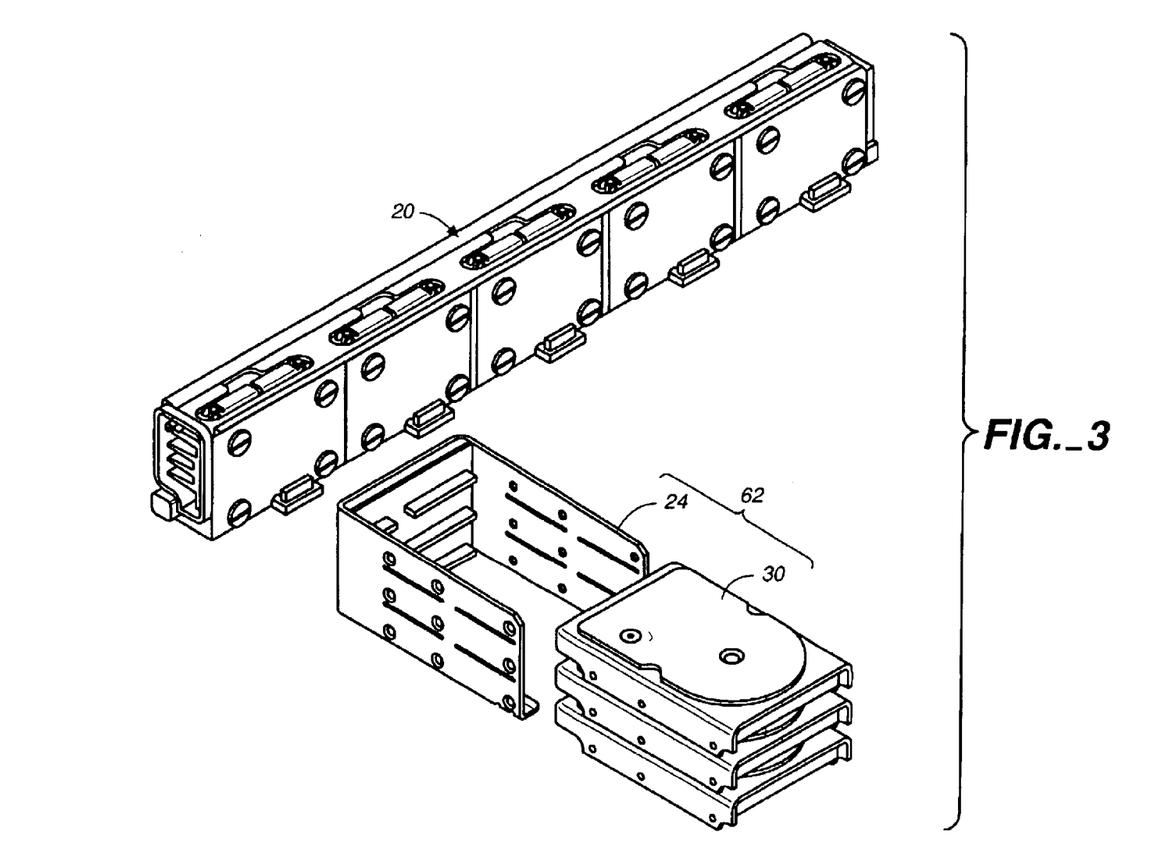
FIG. 3 is an exploded perspective view of a drive rail and a drive pack having features of the present invention.

FIG. 3 illustrates a perspective view of the first drive rail 20 and the bracket 24 and disk drives 30 from one of the drive packs 62 positioned away from the first drive rail 20. FIG. 3 illustrates that the bracket 24 is substantially "U" shaped and three disk drives 30 fit within the bracket 24. One or more fasteners (not shown) secure each disk drive 30 to one of the brackets 24. While the first drive rail 20 is outside the housing 18, the drive packs 62 can be easily removed from the drive rail 20 for service and/or replacement of one or more of the disk drives 30.

Figure 4:
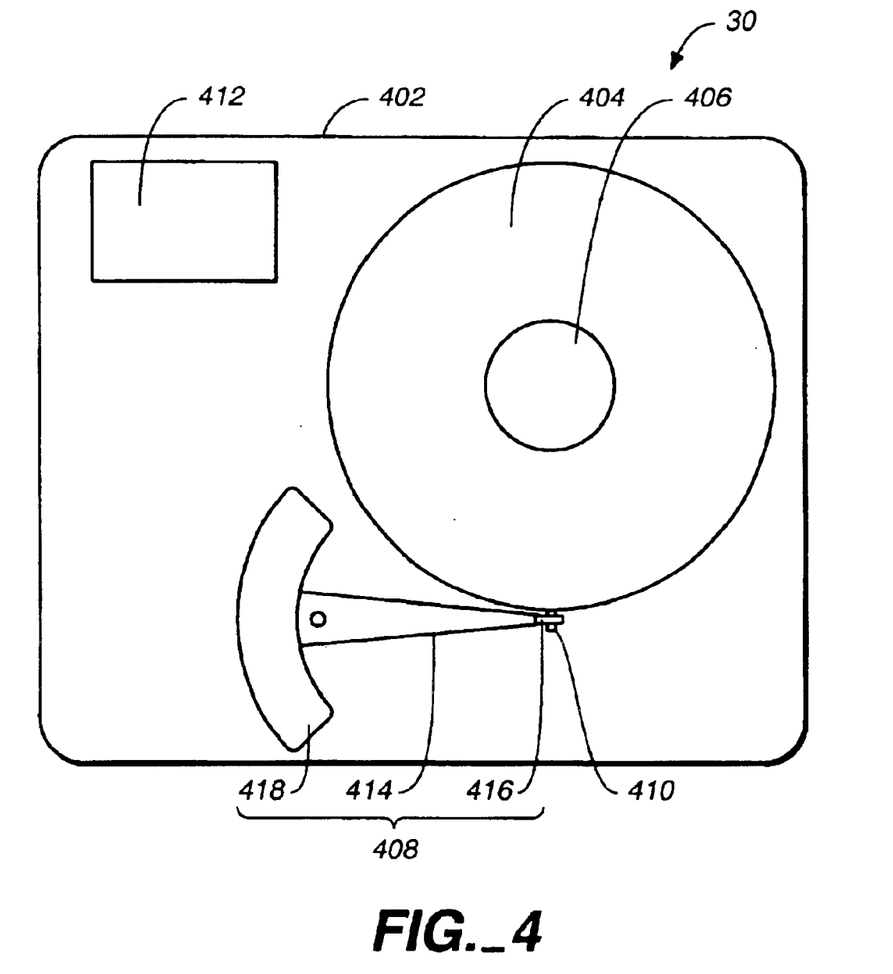
FIG. 4 is a simplified top illustration of a portion of a disk drive that can be used with the present invention.

FIG. 4 is a simplified illustration of a disk drive 30 that can be used in the present invention. In this embodiment, the disk drive 30 includes (i) a drive housing 402, (ii) one or more rotating, magnetic storage disks 404, (iii) a spindle motor 406 that rotates the storage disks 404, (iv) a head stack assembly 408, (iv) a ramp 410, and (v) electronics 412 (illustrated as a box). The head stack assembly 408 includes an E-block 414, one or more data transducers 416, and an actuator motor 418. The actuator motor 418 positions the transducers 416 relative to the storage disks 404. The actuator motor 418 can be a voice coil motor.

The head stack assembly 408 engages the ramp 410 to inhibit contact between the transducers 416 and the storage disk 404 during non-rotation of the storage disks 404. During shut-down of the disk drive 30, the actuator motor 418 moves the head stack assembly 408 to engage the ramp 410. This inhibits damage to the head stack assembly 408 and the storage disks 404 caused by contact between the head stack assembly 408 and the storage disks 404. As illustrated in FIG. 4, the ramp 410 can be positioned near the outer diameter of the storage disk 404. Alternately, for example, a textured, non-data region (not shown) of the storage disk 404 can be used instead of the ramp 410.

Each of the disk drives 30 can be controlled by the controller (not shown in FIG. 4) to alternately be in a power-off mode, a standby mode, an idle mode, and a write/read mode. In the power-off mode, no power is delivered to the disk drive 30. In the standby mode, the electronics 412 are powered up, but the spindle motor 406 is not rotating the storage disks 404, e.g., the storage disks 404 are not spinning. In the idle mode, the electronics 412 are powered up and the spindle motor 406 is rotating the storage disks 404, but there is no write or read activity. In the write/read mode, the electronics 412 are powered up, the spindle motor 406 is rotating the storage disks 404, and there is write or read activity. The power consumed by the disk drives 30, and therefore the heat generated from the disk drives 30, increase as you progress through each of these four modes.

In the present invention each of the disk drives 30 can be an ATA type disk drive. Alternately, each of the disk drives 30 can be a SCSI or fiber-channel type disk drive.

Figure 5:
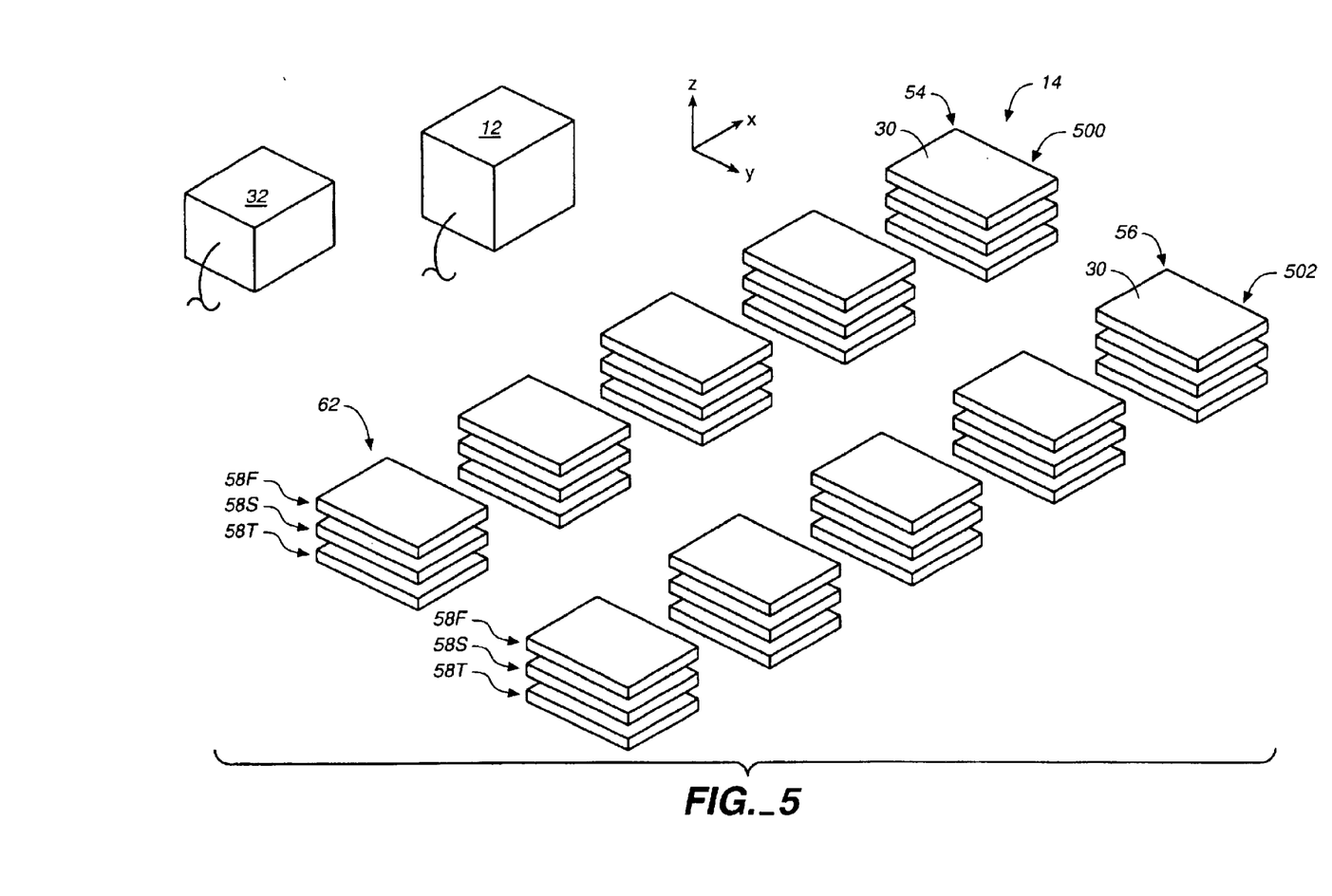
FIG. 5 is a simplified perspective illustration of the data storage system and the host system.

FIG. 5 is a schematic illustration of the host system 12, the controller 32, and the disk drives 30 for the first rail assembly 54 and the second rail assembly 56. In FIG. 5, each rail assembly 54, 56 includes three rows 58F, 58S, 58T of disk drives 30.

The controller 32 controls how data is transferred between the host system 12 and the disk drives 30. The controller 32 can include a processor and the appropriate software. The data can be transferred between the host system 12 and the disk drives 30 in a number of different ways. As provided herein, not all of the disk drives 30 are utilized during a particular data transfer between the host system 12 and the storage system 14. For example, one or more of the disk drives 30 can be in the power-off mode, the standby mode or the idle mode while one or more of the disk drives 30 are in the write/read mode. Stated another way, not all of the disk drives 30 are in the write/read mode at the same time. The disk drives 30 in the write/read mode are used during data storage and retrieval operations.

Because not all of the disk drives 30 are in the write/read mode during a data transfer, the power consumed by the storage system 14 is reduced and the cooling requirements for the storage system 14 are reduced. The number of disk drives 30 in the write/read mode at a given time depends upon the ability of the storage system 14 to dissipate heat generated by the disk drives 30 that are in the write/read mode. Given a maximum environmental temperature specification of the storage system 14 and maximum temperature specification for each of the disk drives 30, the present invention allows for higher density packaging of disk drives 30 within the storage system 14.

Additionally, the total internal data bandwidth required by the storage system 14 is the product of the number of disk drives 30 that may simultaneously be in the write/read mode. By limiting the number of disk drives simultaneously in the write/read mode, the total internal bandwidth required by the storage system 14 is reduced. This decreases the hardware cost of the storage system 14 by allowing the use of fewer internal data buses and lower performance components on the data buses.

Moreover, the present invention reduces the amount of power required by the storage system 14, reduces the overall heat generated by the storage system 14, and decreases the overall size of the storage system 14. This decreases the hardware cost of the storage system 14, the electrical power requirements, and the cooling requirements.

Additionally, by spinning up only those disk drives 30 required for the data transfer, this improves the ruggedness and durability of storage system 14. In the type of disk drive 30 illustrated in FIG. 4, the transducers 416 are unloaded from the storage disks 404 when in the disk drive 30 is in the standby mode. This increases the durability of the stored data. Also, regardless of type of disk drive 30 utilized, the act of spinning down the unused drives has a significant effect on harmonics in the storage system 14.

Referring back to FIG. 5, in the storage system 14, data can be directed simultaneously to a first active subset 500 of disk drives 30 and a second active subset 502 of disk drives 30. In this design, the disk drives 30 that are not in the first active subset 500 or the second active subset 502 are not used for the transfer of data. Alternately, the data can be directed to more than two active subsets 500, 502 of disk drives 30 simultaneously or less than two active subsets 500, 502.

With this design, only the disk drives 30 in the active subsets 500, 502 will be in the write/read mode during data transfer. In contrast, the disk drives 30 that are not within the active subsets 500, 502 can be in the standby mode. This reduces the amount of heat generated by the storage system 14, the power consumption of the storage system, and the amount of heat that must be removed from the storage system to prevent overheating of the disk drives 30.

The number of disk drives 30 in each active subset 500, 502 can vary according to the way that data is transferred to the active subsets 500, 502. In the design illustrated in FIG. 5, the first active subset 500 can include five disk drives 30 and the second active subset 502 can also include five disk drives 30. Alternately, for example, each active subset 500, 502 can include more than five or less than five disk drives 30.

In FIG. 5, each active subset 500, 502 is taken from one of the rows 58F, 58S, 58T of disk drives 30. Further, the active subsets 500, 502 can be taken from the same rail assembly 54, 56 or from both rail assemblies 54, 56. For example, the first active subset 500 can be the five disk drives 30 in the first row 58F of the first rail assembly 54 and the second active subset 502 can be the five disk drives 30 in the first row 58F of the second rail assembly 56. In this example, the disk drives 30 in the second rows 58S and the third rows 58T of the rail assemblies 54, 56 are in the standby mode during data transfer.

Alternately, the first active subset 500 can be the five disk drives 30 in the second row 58S of the first rail assembly 54 and the second active subset 502 can be the five disk drives 30 in the third row 58T of the first rail assembly 54. In this example, the disk drives 30 in the first row 58F of the first rail assembly 54 and all of the disk drives 30 in the second rail assembly 56 are in the standby mode during data transfer.

Still alternately, the first active subset 500 can be the five disk drives 30 in the second row 58S of the first rail assembly 54 and the second active subset 502 can be the five disk drives 30 in the third row 58T of the second rail assembly 56. In this example, the disk drives 30 in the first and third rows 58F, 58T of the first rail assembly 54 and the disk drives 30 in the first and second rows 58F, 58S of the second rail assembly 56 are in the standby mode during data transfer.

In each of these examples, for the first active subset 500, each disk drive is at the same position along the Z axis and each disk drive 30 is positioned in a different drive pack 62. Similarly, for the second active subset 502, each disk drive 30 is at the same position along the Z axis and each disk drive 30 is positioned in a different drive pack 62. Alternately, for example, for each active subset 500, 502, each disk drive 30 could be at an alternate position along the Z axis. However, this could be more complicated to wire and control.

In one embodiment of the present invention, each drive pack 62 is a field replaceable unit or FRU. In this embodiment, no attempt is made to replace individual drives in the field; if a single drive fails the entire drive pack is swapped out and returned to a service center where the good drives can be salvaged and placed back in the pool of spare service parts. It is important to note that in the current implementation, RAID (Redundant Array of Independent Disks) style parity protection is computed across each individual active subset 500, 502. Whereas RAID can tolerate the loss of a single drive's data and reconstruct it from the stored parity, RAID cannot tolerate or recover data if two or more disks fail in the same RAID set. Because of this, the system does not have members of the same active subset 500 at different positions along the Z-axis in the same drive pack (although they may be at different positions along the Z-axis in different drive packs).

Additionally, in each of these examples, during a transfer operation, ten of the disk drives 30 are in the write/read mode and twenty of the disk drives 30 are in the standby mode at approximately the same time. Stated anther way, one third of the disk drives 30 are in the write/read mode and two-thirds of the disk drives 30 are in the standby mode at the same time.

In an alternate design, the storage system 14 can include a total of twenty disk drives 30. In this design, during a transfer operation, ten of the disk drives 30 can be in the write/read mode and ten of the disk drives 30 can be in the standby mode. Stated another way, one half of the disk drives 30 would be in the write/read mode and one half of the disk drives 30 would be in the standby mode.

In yet another alternate design, the storage system 14 can include a total of fifteen disk drives 30. In this design, during a transfer operation, ten of the disk drives 30 can be in the write/read mode and five of the disk drives 30 can be in the standby mode. Stated anther way, two-thirds of the disk drives 30 are in the write/read mode and one third of the disk drives 30 are in the standby mode.

When there is no activity between the host system 12 and the storage system 14, all disk drives 30 can be switched to the standby mode. This minimizes the power consumption of the storage system and the amount of heat generated by the storage system 14. Further, because the disk drives 30 are in standby mode for much of the time, the failure rate of the disk drives 30 will tend to be lower than if the disk drives 30 were always in the idle mode or write/read mode. Because of the relatively large number of disk drives 30 in the storage system 14, this reduction in individual failure rate has a significant impact on the cost to maintain the storage system 14.

Instead of putting all of the disk drives 30 in the standby mode when not being accessed for write or read operations, the disk drives 30 in the active subsets 500, 502 could be maintained in the idle mode. The advantage of this approach is that the response time of the storage system 14 for a backup or restore is faster, e.g. less than approximately 1 second.

The storage system 14 can be made fault-tolerant by redundantly storing the data on the active subsets 500, 502. For example, data can be transferred to and from the active subsets 500, 502 using parity protection. With this design, the overall availability of the storage system 14 is not impacted by the failure of an individual disk drive 30. For example, data can be written to each active subset 500, 502 using RAID-3, RAID-4, or RAID-5 algorithms. In the present invention, if RAID-3 is utilized, stripes of data at a byte level are stored across four of the disk drives 30 and parity is stored in one of the disk drives 30 in each of the active subsets 500, 502. Alternately, if RAID-4 is utilized, stripes of data at a block level are stored across four of the disk drives 30 and parity is stored in one of the disk drives 30 in each of the active subsets 500, 502. Still alternately, if RAID-5 is utilized, stripes of data at a block level are stored across five of the disk drives 30 and parity is distributed among the disk drives 30 in each of the active subsets 500, 502.

When using RAID-3, RAID-4, RAID-5 configurations, a drive pack 62 containing a failed drive 30 can be removed when the storage system 14 is in the idle mode ("warm swap") without any loss of information. The storage system 30 can rebuild the full RAID set from the information contained in the remaining four disk drives 30 in the active subsets 500, 502.

Alternately, data can be written to each drive subset 500, 502 in a number of other fashions, including no RAID, RAID-1 (mirroring) or RAID-0 (striping). With RAID-0 and no RAID, no redundant information is stored. Thus, failure of one of the disk drives 30 will result in a loss of data. RAID-1 provides redundancy while transferring data to two or more disk drives 30. Still alternately, RAID-2 could be utilized. RAID-2 uses Hamming error correction codes.

In these alternate embodiments, the total number of drive subsets and the number of disk drives 30 in each subset can be quite different. Further, it is possible to write data to or read the data from smaller active subsets 500, 502 of disk drives 30 than described above. For example, instead of transferring data to the ten disk drives 30 in the active subsets 500, 502 described above, RAID-1, parity protection could be used. If RAID-1 is used, two disk drives 30 are required for each active subset 500, 502. Because fewer disk drives 30 are in the write/read mode, less heat is generated by the disk drives 30 during the transfer of data. While data throughput performance is reduced, the storage system 14 would be able to operate in higher ambient temperatures.

A more complete discussion of RAID-0 through. RAID-5 is provided in the paper entitled "A Case for Redundant Arrays of Inexpensive Disks (RAID)", by Patterson, Gibson, and Katz at the University of California Berkeley, in 1987, the contents of which are incorporated herein by reference.

The present invention can be designed to emulate and/or replace a tape drive storage system (not shown) having a first tape drive (not shown) and a second tape drive (not shown). More specifically, the first active subset 500 of disk drives 30 can emulate the first tape drive and the second active subset 502 of disk drives 30 can emulate the second tape drive.

If the storage system 14 is used to simulate a tape library, to begin a backup or restore operation, the backup software sends a MOVE MEDIUM command to the library to move'the cartridge from the storage element to the tape drive. Once the cartridge is in the tape drive, the backup software then sends a LOAD command to the tape drive. It is during this operation that the storage system 14 changes the state of the disk drives 30 in the active subsets 500, 502 from standby mode to idle mode. As described before, when the disk drives 30 are in the idle mode, the disks are spinning. When the disk drives 30 have transitioned to the idle mode, the storage system 14 acknowledges that the LOAD command is complete. The backup software can then transfer data to or from the storage system 14, depending on whether this is a backup or restore operation.

When the data is backed up to or restored from the storage system 14, the backup software issues an UNLOAD command to the tape drive in which the virtual cartridge is stored. At this time, the storage system 14 can leave the disk drives 30 in the standby state or can wait some amount of time, e.g. 10 minutes to see if the next virtual cartridge that is commanded to be loaded into a tape drive is contained in the same active subset or not. The advantage of the former technique is that this reduces the power consumed by the storage system 14. The advantage of the latter technique is that this reduces the number of times that the active subsets of disk drives 30 transition between the standby mode and idle mode.

When backing up or restoring from tape drives, there is typically minutes of delay before the tape drives are ready to begin writing or reading data, compared to the 10 to 15 seconds of delay associated with spinning up the disk drives 30 required for the backup or restore operation with the present storage system 14.

It should be noted that the present storage system 14 can be designed and used without emulating a tape backup system.

While the particular storage system 14 as herein shown and disclosed in detail is fully capable of obtaining the objects and providing the advantages herein before stated, it is to be understood that it is merely illustrative of the presently preferred embodiments of the invention and that no limitations are intended to the details of construction or design herein shown other than as described in the appended claims.

What is claimed is:

1. A storage system that stores data from a host system, the storage system comprising:
    a housing;
    a plurality of disk drives positioned within the housing; and
    a controller that controls the disk drives, wherein at least two of the disk drives are in different modes during the transfer of data to at least one of the disk drives.

2. The storage system of claim 1 wherein the controller directs data to a first subset of disk drives and a second subset of disk drives simultaneously.

3. The storage system of claim 2 wherein at least one of the subsets includes five disk drives.

4. The storage system of claim 2 wherein the controller directs the data to each subset using parity protection.

5. The storage system of claim 1 wherein at least one third of the disk drives are in a stand-by mode during the transfer of data to at least one of the disk drives.

6. The storage system of claim 1 wherein at least one half of the disk drives are in a stand-by mode during the transfer of data to at least one of the disk drives.

7. The storage system of claim 1 wherein at least two thirds of the disk drives are in a stand-by mode during the transfer of data to at least one of the disk drives.

8. The storage system of claim 1 further comprising a first drive rail that retains the disk drives, wherein the disk drives are arranged in a first row of disk drives and a second row of disk drives, and wherein the disk drives in the first row are in a write mode while the disk drives in the second row are in a standby mode.

9. The storage system of claim 1 further comprising a first drive rail that retains the disk drives, wherein the disk drives are arranged in a first row of disk drives, a second row of disk drives, and a third row of disk drives, and wherein the disk drives in the first and second rows are in a write mode while the disk drives in the third row are in a standby mode.

10. The storage system of claim 1 further comprising a first drive rail that retains the disk drives, wherein the disk drives are arranged in a first row of disk drives, a second row of disk drives and a third row of disk drives, and wherein the disk drives in the first row are in a write mode while the disk drives in the second and third rows are in a standby mode.

11. The storage system of claim 1 wherein the disk drives are arranged into six rows of disk drives, and wherein the disk drives in two of the rows are in a write mode while the disk drives in four of the rows are in a standby mode.

12. A combination comprising a host system and the storage system of claim 1.

13. A method for storing data from a host system, the method comprising the steps of:
    providing a plurality of disk drives positioned within a housing; and
    controlling the disk drives so that at least two of the disk drives are in different modes during the transfer of data to at least one of the disk drives.

14. The method of claim 13, wherein the step of controlling the disk drives includes simultaneously directing data to a first subset of disk drives and a second subset of disk drives.

15. The method of claim 13, wherein the step of controlling the disk drives includes placing at least one third of the disk drives in a stand-by mode during the transfer of data to at least one of the disk drives.

16. The method of claim 13, wherein the step of controlling the disk drives includes placing at least one half of the disk drives in a stand-by mode during the transfer of data to at least one of the disk drives.

17. The method of claim 13, wherein the step of controlling the disk drives includes placing at least two-thirds of the disk drives in a stand-by mode during the transfer of data to at least one of the disk drives.

18. The method of claim 13, wherein the step of providing a plurality of disk drives includes the step of arranging the disk drives into at least two rows, and wherein the step of controlling the disk drives includes placing the disk drives in at least one of the rows in a write mode while the disk drives in at least one of the rows in a standby mode.

19. The method of claim 13, the step of providing a plurality of disk drives includes the step of arranging the disk drives into at least three rows, and wherein the step of controlling the disk drives includes placing the disk drives in at least two of the rows in the write mode while the disk drives in at least one of the rows in the standby mode.

20. The method of claim 13, wherein the step of providing a plurality of disk drives includes the step of arranging the disk drives into at least three rows, and wherein the step of controlling the disk drives includes placing the disk drives in at least one of the rows in a write mode while the disk drives in at least two of the rows in a standby mode.

21. The method of claim 13, wherein the step of providing a plurality of disk drives includes the step of arranging the disk drives into six rows, and wherein the step of controlling the disk drives includes placing the disk drives in two of the rows in a write mode while the disk drives in four of the rows in the standby mode.

22. The storage system of claim 1, wherein the plurality of disk drives includes a first disk drive and a second disk drive, each disk drive including a rotatable storage disk, and wherein the first disk drive is in a write mode while another of the disk drives is in an idle mode that allows the storage disk of the second disk drive to rotate without any data being transferred to the second storage disk.

23. The storage system of claim 22, wherein the first disk drive and the second disk drive have a substantially similar structure.

24. A storage system that stores data from a host system, the storage system comprising:
    a housing;
    a plurality of disk drives positioned within the housing including a first disk drive having a rotatable first storage disk, and a second disk drive having a rotatable second storage disk; and
    a controller that controls the disk drives so that the first disk drive is in a first mode wherein the first storage disk rotates without data being transferred from the host system to the first storage disk, while the second disk drive is in a second mode that is different than the first mode.

25. The storage system of claim 24, wherein the second mode is a write mode wherein data is being transferred to the second storage disk.

26. The storage system of claim 25, wherein the number of disk drives that are in the write mode is dependent upon the temperature of the disk drives that are in the write mode.

27. The storage system of claim 24, wherein the second mode is a stand-by mode wherein the second storage disk is not rotating.

28. A storage system that stores data from a host system, the storage system comprising:

a housing;

a plurality of disk drives positioned within the housing including a first subset of at least two disk drives and a second subset of at least two disk drives, each disk drive of the first subset including a rotatable first storage disk, each disk drive of the second subset including a rotatable second storage disk, each disk drive in the first subset being in a write mode wherein data is transferred between the host system and the first subset of disk drives, each disk drive in the second subset being in a stand-by mode wherein each of the second storage disks is not rotating; and a controller that controls the number of disk drives that are in one of the write mode and the stand-by mode based upon the temperature of the disk drives in the write mode.

29. The storage system of claim 28, wherein the disk drives have a substantially similar structure to each other.

30. The storage system of claim 28, wherein the plurality of disk drives includes a third subset of at least two disk drives each including a rotatable third storage disk, each disk drive of the third subset being in an idle mode wherein each third storage disk rotates while no data is being transferred between the host system and the third subset of disk drives.

31. The storage system of claim 28, wherein at least one third of the disk drives are in the stand-by mode.

32. The storage system of claim 28, wherein, at least two thirds of the disk drives are in the stand-by mode.

33. The storage system of claim 28, further comprising a first drive rail that retains the disk drives, wherein the disk drives are arranged in a first row of disk drives and a second row of disk drives, and wherein the disk drives in the first row are in the write mode while the disk drives in the second row are in the standby mode.

34. The storage system of claim 28, further comprising a first drive rail that retains the disk drives, wherein the disk drives are arranged in a first row of disk drives, a second row of disk drives, and a third row of disk drives, and wherein the disk drives in the first and second rows are in the write mode white the disk drives in the third row are in the standby mode.

35. The storage system of claim 28, further comprising a first drive rail that retains the disk drives, wherein the disk drives are arranged in a first row of disk drives, a second row of disk drives and a third row of disk drives, and wherein the disk drives in the first row are in the write mode while the disk drives in the second and third rows are in the standby mode.

36. The storage system of claim 28, wherein the disk drives are arranged into six rows of disk drives, and wherein the disk drives in two of the rows are in the write mode while the disk drives in four of the rows are in a standby mode.

37. A combination comprising a host system and the storage system of claim 28.

* * * * *

UNITED STATES PATENT AND TRADEMARK OFFICE
CERTIFICATE OF CORRECTION

PATENT NO. : 6,892,275 B2
DATED : May 10, 2005
INVENTOR(S) : Bolt et al.

It is certified that error appears in the above-identified patent and that said Letters Patent is hereby corrected as shown below:

Column 11,
Line 16, please insert -- , including a first disk drive and a second disk drive, the first disk drive being in a write mode wherein data is being transferred from the host system to the first disk drive, the second disk drive having a rotatable storage disk, the second disk drive changable between a write mode wherein data is being transferred from the host system to the second disk drive and a stand-by mode wherein the storage disk is not rotating -- after the phrase "the housing".
Line 18, please insert -- whether the second disk drive is in the write mode or the stand-by mode based upon the temperature of the first -- after the phrase "that controls".
Lines 18-20, please delete the phrase "disk drives, wherein at least two of the disk drives are in different modes during the transfer of data to at least one of the disk drives".
Line 65, please insert -- whether one of -- after the word "controlling".
Line 65, please insert -- is in one of a write mode and a stand-by mode based upon the temperature of at least one other -- after the phrase "disk drives".
Lines 65-67, please delete "so that at least two of the disk drives are in different modes during the transfer of data to at least one".
Line 67, please insert -- within the housing -- after the phrase "disk drives".

Column 12,
Line 1, please delete the "," after the word "claim".
Lines 2, 6, 10, 14, 20, 26, 32 and 38, please delete the phrase "the disk drives".
Lines 5, 9, 13, 17, 23, 29 and 35, please delete the "," after the phrase "claim 13".
Lines 7, 11, 15, 21, 22, 33, 34, 39 and 44, please delete the word "a" and substitute therefore -- the --.
Line 22, please insert the word -- are -- after the phrase "the rows".
Lines 28 and 34, please insert the word -- are -- after the phrase "of the rows".
Line 40, please insert the word -- are -- after the phrase "rows".
Line 41, please delete the "," after the phrase "claim 1".
Line 48, please delete the "," after the phrase "claim 22".
Line 56, please delete the word "and".
Line 57, please insert -- , and a third disk drive having a rotatable third storage disk -- after the phrase "storage disk".
Line 63, please insert -- , and the third disk drive is in a write mode wherein data is transferred from the host system to the third storage disk, the controller controlling the mode of the second disk drive based upon the temperature of the third disk drive -- after the phrase "first mode".
Line 64, please delete the "," after the phrase "claim 24".
Line 67, please delete the "," after the phrase "claim 25".

UNITED STATES PATENT AND TRADEMARK OFFICE
CERTIFICATE OF CORRECTION

PATENT NO. : 6,892,275 B2
DATED : May 10, 2005
INVENTOR(S) : Bolt et al.

It is certified that error appears in the above-identified patent and that said Letters Patent is hereby corrected as shown below:

Column 13,
Line 1, please delete the "," after the phrase "claim 24".
Line 18, please insert -- whether one of -- after the phrase "that controls".
Line 18, please delete the phrase "number of".
Line 18, please delete the phrase "that are".
Line 19, please insert the word -- is -- before the phrase "in one of".
Line 20, please insert the phrase -- at least one other of -- after the phrase "temperature of".
Lines 20-21, please delete the phrase "in the write mode" and substitute therefore -- within the housing --.
Lines 22, 24 and 30, please delete the "," after the phrase "claim 28".

Column 14,
Lines 1, 3, 9, 16 and 23, please delete the "," after the phrase "claim 28".

Signed and Sealed this

Thirtieth Day of August, 2005

JON W. DUDAS
*Director of the United States Patent and Trademark Office*